United States Patent
Lorenz et al.

(10) Patent No.: US 9,367,913 B2
(45) Date of Patent: Jun. 14, 2016

(54) CHOOSING ANATOMICAL VARIANT MODEL FOR IMAGE SEGMENTATION

(75) Inventors: Cristian Lorenz, Hamburg (DE); Hans Barschdorf, Dassendorf (DE); Tobias Klinder, Briarcliff Manor, NY (US); Raghed Hanna, Kobienz (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 467 days.

(21) Appl. No.: 13/823,472

(22) PCT Filed: Sep. 13, 2011

(86) PCT No.: PCT/IB2011/053991
§ 371 (c)(1),
(2), (4) Date: Mar. 14, 2013

(87) PCT Pub. No.: WO2012/035488
PCT Pub. Date: Mar. 22, 2012

(65) Prior Publication Data
US 2013/0286013 A1    Oct. 31, 2013

(30) Foreign Application Priority Data

Sep. 17, 2010 (EP) ..................................... 10177387

(51) Int. Cl.
*G06T 7/00* (2006.01)
*G06T 17/00* (2006.01)
*G06T 15/08* (2011.01)

(52) U.S. Cl.
CPC ............. *G06T 7/0012* (2013.01); *G06T 7/0083* (2013.01); *G06T 7/0089* (2013.01); *G06T 15/08* (2013.01); *G06T 17/00* (2013.01); *G06T 2207/30004* (2013.01)

(58) Field of Classification Search
CPC combination set(s) only.
See application file for complete search history.

(56) References Cited

U.S. PATENT DOCUMENTS

| 8,107,707 B2 | 1/2012 | Wiemker et al. |
| 8,509,506 B2 | 8/2013 | Ciofolo et al. |

(Continued)

FOREIGN PATENT DOCUMENTS

| CN | 1553166 A | 12/2004 | |
| WO | 2009034499 A2 | 3/2009 | |
| WO | WO 2009/034499 A2 * | 3/2009 | ............... G06T 7/00 |

OTHER PUBLICATIONS

McInerney, Tim, and Demetri Terzopoulos. "Deformable models in medical image analysis: a survey." Medical image analysis 1.2 (1996): 91-108.*

(Continued)

*Primary Examiner* — Yuwen Pan
*Assistant Examiner* — Zhitong Chen

(57) ABSTRACT

A system (100) for segmenting an object in an image adapts a first model for segmenting the object to the image. A feature is extracted from the image based on the adapted first model. A second model is selected for segmenting the object from a plurality of models for segmenting the object, based on the feature extracted from the image. The second model includes additional detail of the object. The second model is utilized based on the adapted first model and/or the feature extracted from the image; the initialized second model is adapted to the image. The features extracted from the image based on the adapted first model help the system (100) to select the second model for segmenting the object from a plurality of models for segmenting the object. The adapted first model and/or the extracted features are also used for initializing the second model. Because the second model includes the additional detail of the object, the segmentation result using the second model is more complete than the segmentation result Obtained using the first model. Moreover, the initialization of the second model based on the adapted first model and/or the detected features Improves the accuracy of the second model adaptation.

6 Claims, 8 Drawing Sheets

(56) References Cited

U.S. PATENT DOCUMENTS

| | | | |
|---|---|---|---|
| 8,698,795 | B2 | 4/2014 | Grewer et al. |
| 2003/0099386 | A1* | 5/2003 | Schneider ............ G06F 19/3487 382/130 |
| 2005/0002556 | A1* | 1/2005 | Kaus ..................... G06T 7/0083 382/154 |
| 2006/0239519 | A1* | 10/2006 | Nowinski .............. G06K 9/3233 382/128 |
| 2008/0205716 | A1* | 8/2008 | Von Berg .............. G06T 7/0083 382/128 |
| 2008/0205721 | A1* | 8/2008 | Udupa .................. G06K 9/6209 382/128 |
| 2008/0262814 | A1 | 10/2008 | Zheng et al. |
| 2009/0190818 | A1* | 7/2009 | Huo ...................... G06K 9/4609 382/132 |
| 2009/0202150 | A1 | 8/2009 | Fradkin et al. |
| 2010/0086193 | A1 | 4/2010 | Keeven et al. |
| 2010/0232686 | A1* | 9/2010 | Dewan et al. ................. 382/159 |
| 2010/0322496 | A1* | 12/2010 | Liu ....................... G06T 7/0028 382/131 |

OTHER PUBLICATIONS

Von Berg, Jens, and Cristian Lorenz. "Multi-surface cardiac modelling, segmentation, and tracking." Functional Imaging and Modeling of the Heart. Springer Berlin Heidelberg, 2005. 1-11.*

Weese et al, "Shape Constrained Deformable Models for 3D Medical Image Segmentation", Lecture Notes in Computer Science, Vol. 2082, 2001, pp. 380-387.

Starck et al, "Reconstruction of Animated Models From Images Using Constrained Deformable Surfaces", Centre Fro Vision, Speech and Signal Processing, Undated, pp. 1-10.

Krokos et al, "Patient-Specific Muscle Models for Surgical Planning", Proceedings of the Third International Conference on Medical Information Visualisation—Biomedical Visualisation, 0-7695-2303-5/05 IEEE, April 14, 2010, p. 106.

Wasserman et al, "A Patient-Specific in Vivo Tumor Model", Mathematical Biosciences, 136:111-140, 1996, pp. 111-140.

Shimizu et al, "Left Ventricular Midwall Mechanics in Systemic Arterial Hypertension. Myocardial Function Is Depressed in Pressure-Overload Hypertrophy", Circulation, 83, 1991, Downloaded From circ.ahajournals.org, pp. 1676-1684.

Milner et al, "Hemodynamics of Human Carotid Artery Bifurcations: Computational Studies With Models Reconstructed From Magnetic Resonance Imaging of Normal Subjects", Journal of Vascual Surgery, Jul. 1998, pp. 143-156.

Bankman, "Handbook of Medical Imaging", XP-002662933, Handbook of Meidcal Imaging, Medical Image Processing Analysis, 2000, PAGESA 186-187.

Pretorius et al, "Evaluation of Right and Left Ventricular Volume and Ejection Fraction Using a Mathematical Cardiac Torso Phantom", The Journal of Nuclear Medicine, vol. 38, No. 10, Oct. 1997, pp. 1528-1535.

Jacobsen et al, "Evaluation of a 2D Model of the Left Side of the Human Heart Against Magnetic Resonance Velocity Mapping", Cardiovascular Engineering, vol. 1, No. 2, Jun. 2001, Preview Page.

Kohl et al, "Computational Modelling of Biological Systems: Tools and Visions", The Royal Society, Phil. Trans. R. Soc. Lond. A, 2000, 358, pp. 579-610.

Hanna et al, "A Hybrid Method for Automatic Anatomical Variant Detection and Segmentation", Institute of Biomedical Engineering, Karlsruhe Institute of Technology, XP-002662934, FIMH 2011, pp. 333-340.

Lorenz et al, "A Comprehensive Shape Model of the Heart", Medical Image Analysis, Vol. 10, Issue 4, Abstract.

Cootes, T.F. "The Use of Active Shape Models for Structures in Medical Images", Vision Computing vol. 12 No. 6 Jul. 1994.pp. 355-374.

McInerney, T. et al. "Deformable Models in Medical Image Analysis: A Survey", Medical Image Analysis, 1(2):91-108, 1996.

\* cited by examiner

CHOOSING ANATOMICAL VARIANT MODEL FOR IMAGE SEGMENTATION

FIELD OF THE INVENTION

The invention relates to image segmentation and, more particularly, to image segmentation using deformable models.

BACKGROUND OF THE INVENTION

Model-based delineation of organs is an efficient and robust way to segment medical images. In this approach, a model of the organ is adapted to the image, thereby delineating the organ. Such methods were described, for example, in Jürgen Weese, Michael Kaus, Christian Lorenz, Steven Lobregt, Roel Truyen and Vladimir Pekar's *Shape Constrained Deformable Models for 3D Medical Image Segmentation*, Lecture Notes in Computer Science, 2001, Volume 2082/2001, pages 380-387, hereinafter referred to as Ref. 1, and many other papers co-authored by any of the authors of Ref. 1. However, known models are typically fairly rigid and thus their deformation during adaptation to the image is small. Therefore, this approach often fails when applied to segment images depicting organs with high shape variability, especially when the organ shape variants are topologically not equivalent. Examples of such organs include the left atrium of the heart having many variants comprising different numbers of pulmonary veins draining into it, or the kidneys having many different arterial feeding connections.

SUMMARY OF THE INVENTION

It would be advantageous to have a system for image segmentation using deformable models to delineate organs with high anatomical variability.

Thus, in an aspect, the invention provides a system for segmenting an object in an image comprising:
- a first adapter for adapting a first model for segmenting the object to the image;
- an analyzer for extracting a feature from the image based on the adapted first model;
- a selector for selecting a second model for segmenting the object from a plurality of models for segmenting the object, based on the feature extracted from the image, wherein the second model comprises additional detail of the object;
- an initializer for initializing the second model based on the adapted first model and/or the feature extracted from the image; and
- a second adapter for adapting the initialized second model to the image.

The first model is simpler than the second model and thus easier to adapt to the image. Although the object segmented with the first model is typically incomplete, the adapted first model allows the analyzer to extract image features by, for example, providing an indication of the region where the features may be found. The extracted features help the system to select the second model for segmenting the object from a plurality of models for segmenting the object. Because the second model comprises the additional detail of the object, the segmentation result obtained using the second model is more complete than the segmentation result obtained using the first model. Advantageously, the adapted first model and/or the extracted features are used for initializing the second model. Initialization comprises placement of the second model in the image space, e.g. image volume in the case of 3-dimensional images. The initialization of the second model based on the adapted first model and/or the detected features improves the accuracy of the second model adaptation.

In an embodiment of the system, extracting of features is based on at least one of the following: a component of the first model such as a vertex of the first model mesh or a triangle of the first model triangular mesh, a landmark of the first model such as a cusp on the first model surface, and a geometric primitive fitted to the first model such as an axis, a contour, a plane, a polygon, an ellipse, a cylinder, a pyramid, a cube, or an ellipsoid.

In an embodiment of the system, extracting a feature from the image comprises region growing steered by the adapted first model. Region growing may be used for detecting image features such as blood vessel walls and centerlines which help select and initialize the second model comprising the corresponding blood vessel fragments.

In an embodiment of the system, the feature extracted from the image is one of the following: a feature-object such as a ring, a tube, a tube centerline, or a topological sphere with zero, one, two or three handles, and a property of a feature-object such as the diameter of a ring or the number of handles in a topological sphere with handles. A person skilled in the art will understand that a topological sphere is a class of shapes topologically equivalent, i.e. homeomorphic, to a sphere.

In an embodiment of the system, the plurality of models for segmenting the object comprise topologically non-equivalent models. It is important that the selected second model, for example, a surface, is topologically equivalent to the segmented object, for example, a blood vessel wall surface, because it is impossible to properly segment the object using the second model which is topologically non-equivalent to the object. Some objects, such as the left atrium, may have topologically non-equivalent shapes. It is thus important that the plurality of models for modeling the left atrium comprise many topologically non-equivalent models describing topologically non-equivalent shapes of the atrium present in a population of patients.

In a further aspect, the invention provides an image acquisition apparatus comprising a system according to the invention.

In a further aspect, the invention provides a workstation comprising a system according to the invention.

In a further aspect, the invention provides a method of segmenting an object in an image comprising the steps of:
- adapting a first model for segmenting the object to the image;
- extracting a feature from the image based on the adapted first model;
- selecting a second model for segmenting the object based on the feature extracted from the image, wherein the second model comprises additional detail of the object;
- initializing the second model based on the adapted first model and/or the feature extracted from the image; and
- adapting the initialized second model to the image.

In a further aspect, the invention provides a computer program product to be loaded by a computer arrangement, comprising instructions for segmenting an object in an image, the computer arrangement comprising a processing unit and a memory, the computer program product, after being loaded, providing said processing unit with the capability to carry out steps of the method according to the invention.

It will be appreciated by those skilled in the art that two or more of the above-mentioned embodiments, implementations, and/or aspects of the invention may be combined in any way deemed useful.

Modifications and variations of the image acquisition apparatus, of the workstation, of the method, and/or of the computer program product, which correspond to the described modifications and variations of the system or of the method, can be carried out by a person skilled in the art on the basis of the description.

A person skilled in the art will appreciate that an image dataset in the claimed invention may be a 2-dimensional (2-D), 3-dimensional (3-D) or 4-dimensional (4-D) image dataset, acquired by various acquisition modalities such as, but not limited to, X-ray Imaging, Computed Tomography (CT), Magnetic Resonance Imaging (MRI), Ultrasound (US), Positron Emission Tomography (PET), Single Photon Emission Computed Tomography (SPECT), and Nuclear Medicine (NM).

The invention is defined in the independent claims. Advantageous embodiments are defined in the dependent claims.

BRIEF DESCRIPTION OF THE DRAWINGS

These and other aspects of the invention will become apparent from and will be elucidated with respect to the implementations and embodiments described hereinafter and with reference to the accompanying drawings, wherein.

Identical reference numerals are used to denote similar parts throughout the Figures.

DETAILED DESCRIPTION OF EMBODIMENTS

Figure 1:
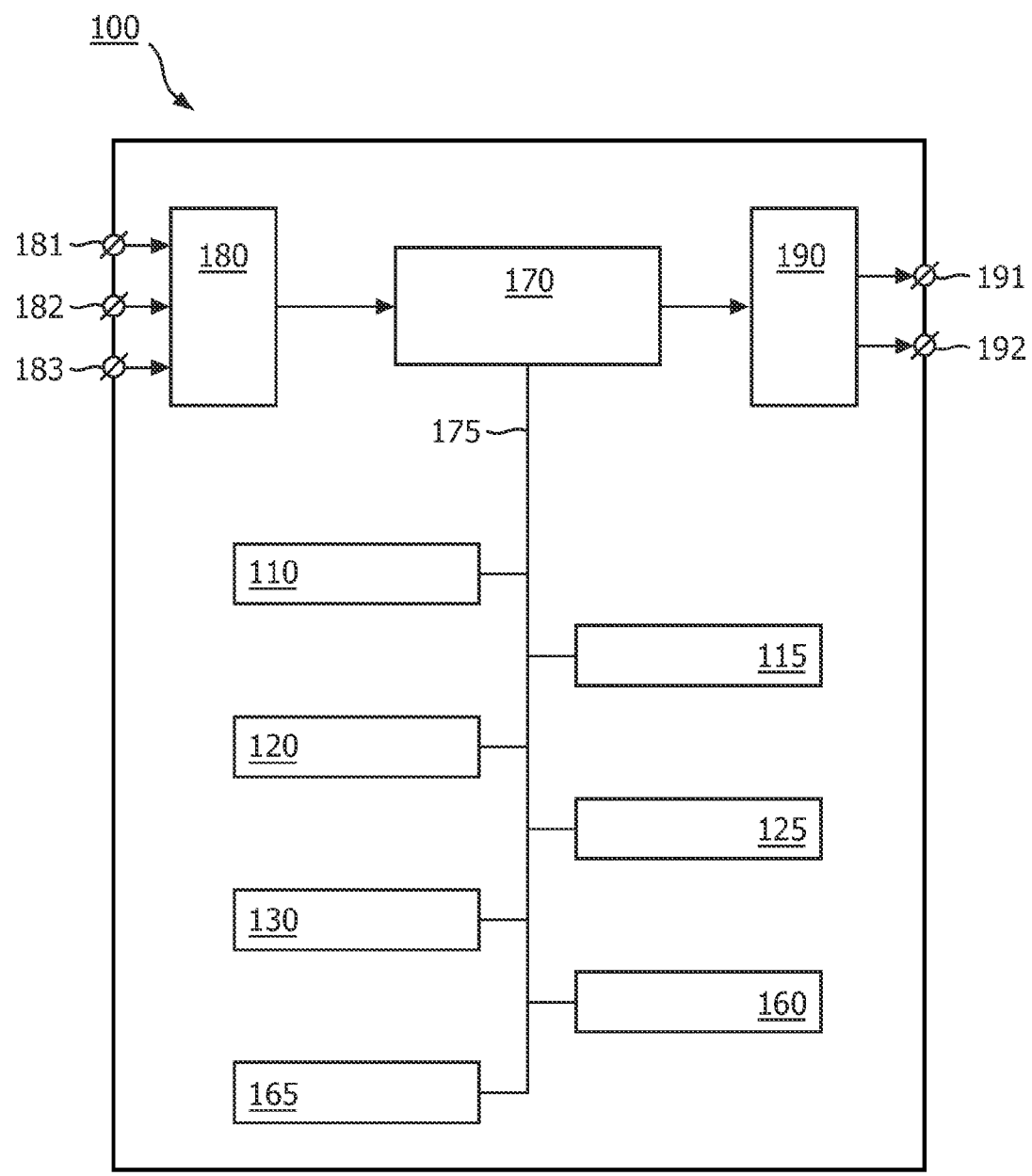
FIG. 1 shows a block diagram of an exemplary embodiment of the system.

FIG. 1 schematically shows a block diagram of an exemplary embodiment of the system 100 for segmenting an object in an image comprising:
- a first adapter 110 for adapting a first model for segmenting the object to the image;
- an analyzer 115 for extracting a feature from the image based on the adapted first model;
- a selector 120 for selecting a second model for segmenting the object based on the feature extracted from the image, wherein the second model comprises additional detail of the object;
- an initializer 125 for initializing the second model based on the adapted first model and/or the feature extracted from the image; and
- a second adapter 130 for adapting the initialized second model to the image.

The exemplary embodiment of the system 100 further comprises:
- a control unit 160 for controlling the work of the system 100;
- a user interface 165 for communication between the user and the system 100; and
- a memory unit 170 for storing data.

In an embodiment of the system 100, there are three input connectors 181, 182 and 183 for the incoming data. The first input connector 181 is arranged to receive data coming in from a data storage means such as, but not limited to, a hard disk, a magnetic tape, a flash memory, or an optical disk. The second input connector 182 is arranged to receive data coming in from a user input device such as, but not limited to, a mouse or a touch screen. The third input connector 183 is arranged to receive data coming in from a user input device such as a keyboard. The input connectors 181, 182 and 183 are connected to an input control unit 180.

In an embodiment of the system 100, there are two output connectors 191 and 192 for the outgoing data. The first output connector 191 is arranged to output the data to a data storage means such as a hard disk, a magnetic tape, a flash memory, or an optical disk. The second output connector 192 is arranged to output the data to a display device. The output connectors 191 and 192 receive the respective data via an output control unit 190.

A person skilled in the art will understand that there are many ways to connect input devices to the input connectors 181, 182 and 183 and the output devices to the output connectors 191 and 192 of the system 100. These ways comprise, but are not limited to, a wired and a wireless connection, a digital network such as, but not limited to, a Local Area Network (LAN) and a Wide Area Network (WAN), the Internet, a digital telephone network, and an analog telephone network.

In an embodiment of the system 100, the system 100 comprises a memory unit 170. The system 100 is arranged to receive input data from external devices via any of the input connectors 181, 182, and 183 and to store the received input data in the memory unit 170. Loading the input data into the memory unit 170 allows quick access to relevant data portions by the units of the system 100. The input data comprises the image, the first model for segmenting the object, and the plurality of models for segmenting the object. The memory unit 170 may be implemented by devices such as, but not limited to, a register file of a CPU, a cache memory, a Random Access Memory (RAM) chip, a Read Only Memory (ROM) chip, and/or a hard disk drive and a hard disk. The memory unit 170 may be further arranged to store the output data. The output data comprises the segmented object defined by the second model adapted to the image. The memory unit 170 may be also arranged to receive data from and/or deliver data to the units of the system 100 comprising the first adapter 110, the analyzer 115, the selector 120, the initializer 125, the second adapter 130, the control unit 160, and the user interface 165, via a memory bus 175. The memory unit 170 is further arranged to make the output data available to external devices via any of the output connectors 191 and 192. Storing data from the units of the system 100 in the memory unit 170 may advantageously improve performance of the units of the system 100 as well as the rate of transfer of the output data from the units of the system 100 to external devices.

In an embodiment of the system 100, the system 100 comprises a control unit 160 for controlling the system 100. The control unit 160 may be arranged to receive control data from and provide control data to the units of the system 100. For example, after selecting the second model, the selector 120 may be arranged to provide control data "the second model is selected" to the control unit 160, and the control unit 160 may be arranged to provide control data "initialize the second model" to the initializer 125. Alternatively, a control function may be implemented in another unit of the system 100.

In an embodiment of the system 100, the system 100 comprises a user interface 165 for communication between a user and the system 100. The user interface 165 may be arranged to receive a user input for selecting the first model for segmenting the object and the plurality of models for segmenting the object. Next, the user interface is adapted for displaying the adapted second model. A person skilled in the art will understand that more functions may be advantageously implemented in the user interface 165 of the system 100.

In an embodiment, the invention is used by a physician for segmenting the left atrium of the human heart in a 3-D CT image. The system 100 may be fully automated. Alternatively, the system 100 may be interactive, accepting user input. For example, after selecting the second model from the plurality of models for segmenting the left atrium, the user interface 165 of the system 100 may be arranged for displaying the selected second model and prompting the user for accepting or rejecting it.

Figure 2A:
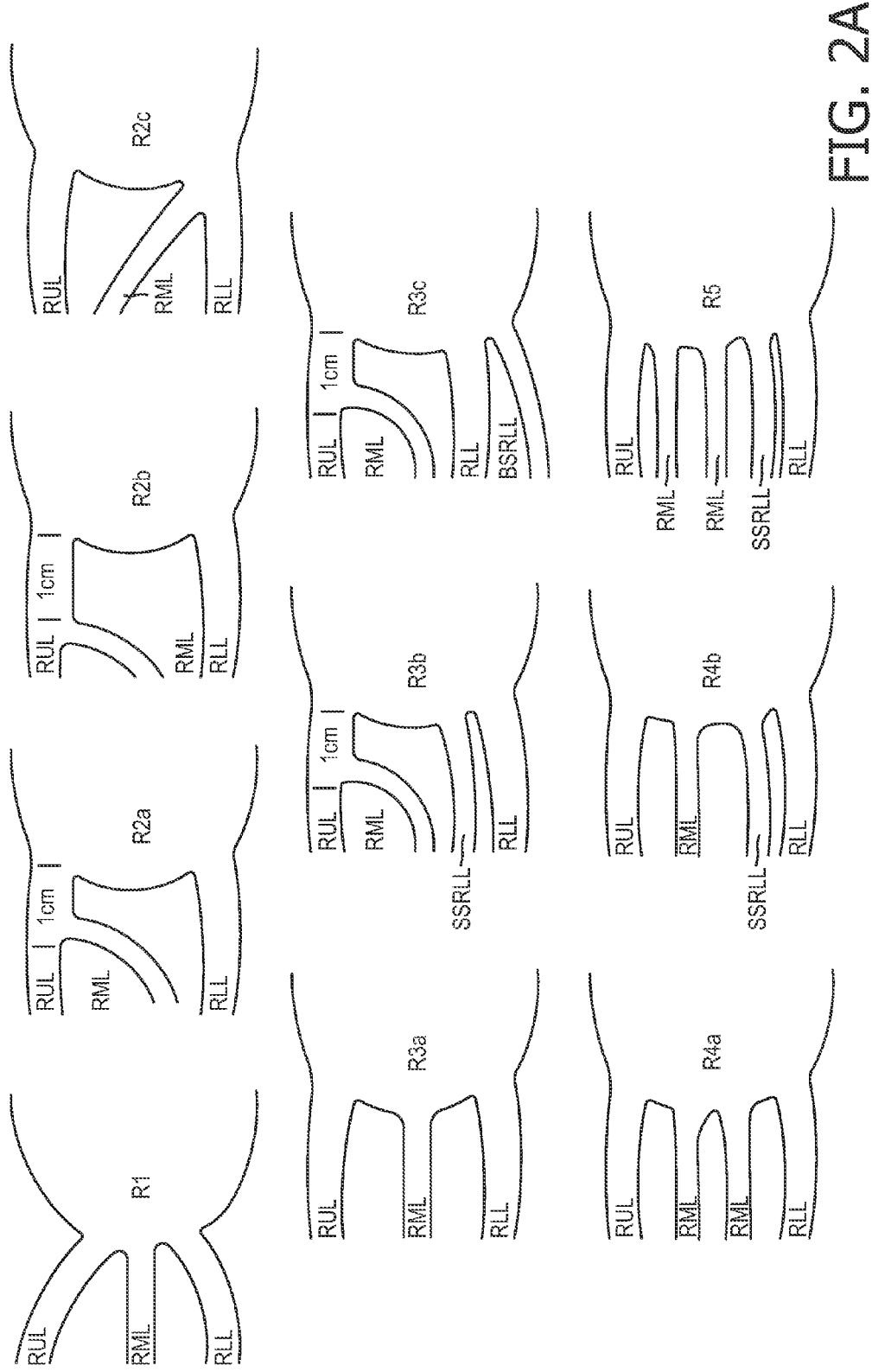
FIG. 2A illustrates anatomical variability of the left atrium.

FIG. 2A illustrates anatomical variability of the right side of the left atrium, defined by the number and position of draining pulmonary veins. The vein labels RUL, RML, RLL, BSRLL, and SSRLL stand for, respectively, right upper lobar, right middle lobar and right lower lobar, basilar segment RLL, and superior segment RLL. The vein patterns are labeled with labels R1, R2a, R2b, R2c, R3a, R3b, R3c, R4a, R4b, and R5.

Figure 2B:
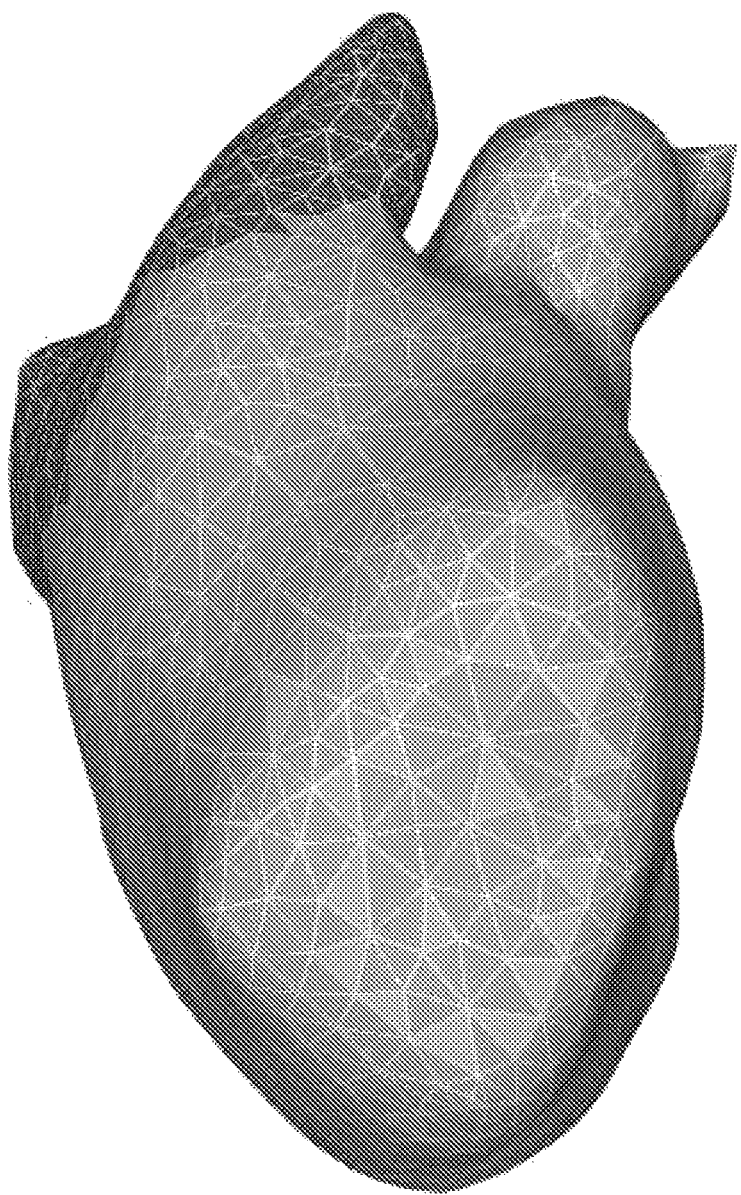
FIG. 2B shows a first model for segmenting the left atrium.

FIG. 2B shows a first model for segmenting the left atrium. The first model comprises a triangular mesh. Faces of triangular meshes are triangles. Image segmentation using models comprising triangular meshes is described in Ref. 1, for example, as well as in many other papers on segmentation based on deformable models easily available both in the patent and scientific literature. Some of the triangles of the first model are marked. The marked triangles may be used by the analyzer 115 for extracting features from the image.

The first model is a simplified model of the left atrium. It does not include the right-side pulmonary veins. The simplified first model can be robustly adapted to the patient image by the first adaptation unit 110 of the system 100.

Figure 2C:
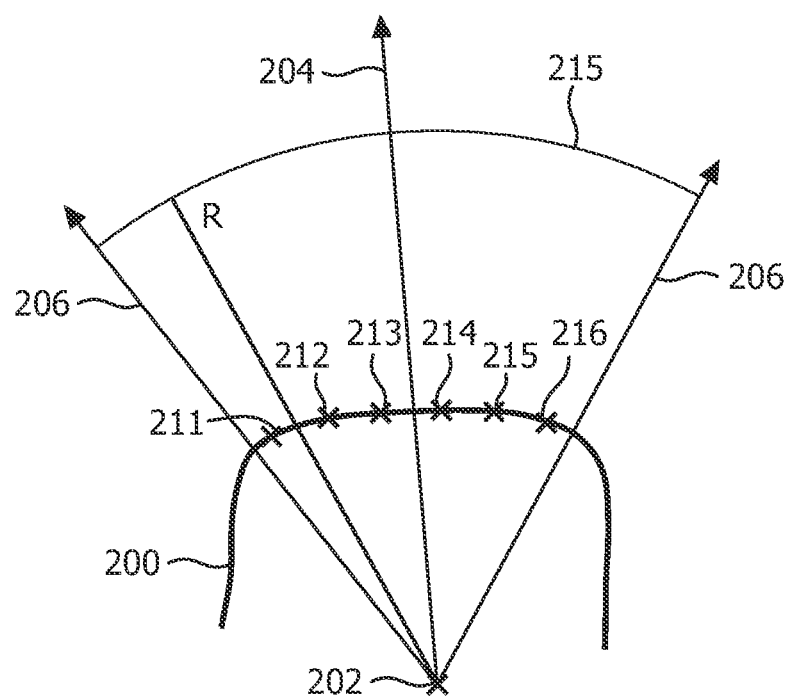
FIG. 2C illustrates exemplary definitions of a cone-like growth space based on the first model for segmenting the left atrium.

After adapting the first model to the image, a steered region growing process is started by the analyzer 115 of the system 100. FIG. 2C schematically illustrates an exemplary definition of a cone-like growth space based on marked triangles of the mesh of the first model for segmenting the left atrium. The analyzer 115 is arranged for determining the center 202 of the first model of the left atrium. The growth direction 204 is the axis of a conical volume with a boundary 206, defined by the centers 211-216 of marked triangles of the adapted first model. Said conical volume is defined by the smallest cone with the vertex placed at the center 202 and comprising all marked triangle centers 211-216. The growth direction 204 is the cone axis. The range R of region growing is a multiple of the mean distance from the center 202 of the first model to the first model surface 200.

Figure 2D:
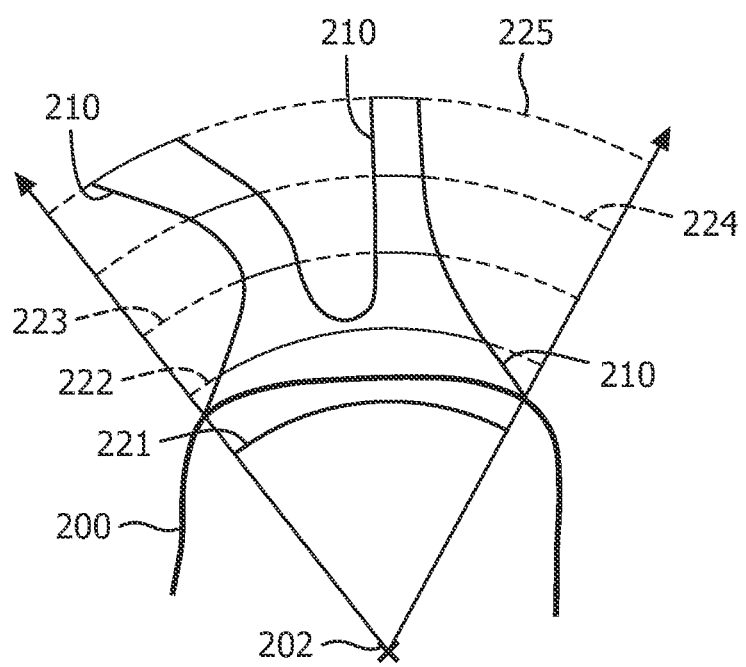
FIG. 2D illustrates detection of a bifurcation of a pulmonary vein draining into the left atrium, using region growing.

FIG. 2D illustrates detection of a bifurcation of a pulmonary vein draining into the left atrium, using region growing. The region growing starts at the seed point which is the center 202 of the first model of the left atrium. The front of the region growing may be, for example, a plane perpendicular to the growth direction 204 or a spherical cap defined by a sphere with the center at the center 202 of the adapted first model and the conical volume with the boundary 206. FIG. 2D shows five spherical fronts 221-215 and the boundaries 210 of the grown region. The boundaries 210 of the grown region represent walls of pulmonary veins draining into the left atrium.

Each front is analyzed to determine its connectedness. In FIG. 2D, fronts 221 and 222 are connected and fronts 223. 224 and 225 are disconnected, each comprising two connected components. Hence, the analyzer is arranged to conclude that there is a bifurcation point in the pulmonary vein modeled by the boundary 210 of the grown region.

A person skilled in the art will understand that there are many other features and that the analyzer 115 may be arranged for detecting these other features. For example, the analyzer 115 may be arranged to compute the curvature of the surface of the first model. Based on an analysis of the curvature, the analyzer 115 may be arranged to determine size and locations of blood vessel stems extending from a structure described by the adapted first model. In yet another example, the analyzer 115 may be arranged for fitting an ellipsoid to the adapted first model. Further, a region growing method can be employed by the analyzer to extract further features from the image. The seed point, the direction, and/or the extent of the region growing may be determined based on the parameters of the fitted ellipsoid.

Figure 3:
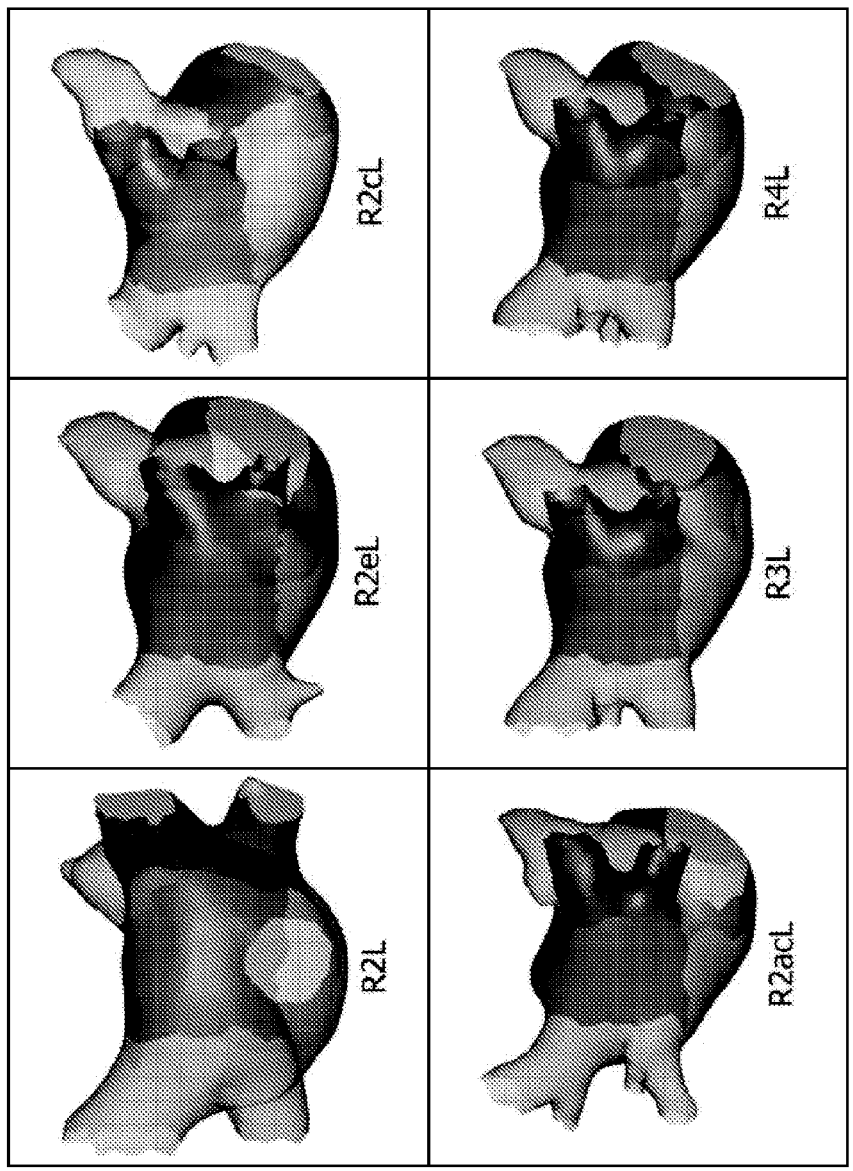
FIG. 3 shows exemplary models for segmenting the left atrium.

Based on the detailed number and positions of the pulmonary veins extracted from the image on the basis of the first model, the selector 120 is arranged for selecting the second model from the plurality of models for segmenting the left atrium. FIG. 3 shows exemplary models for segmenting the left atrium. Some of these models comprise different numbers of pulmonary veins and thus are topologically not equivalent to each other because there is no homeomorphism which transforms one model into another model with a different number of pulmonary veins. Therefore it is very important for the segmentation based on deformable models to select a suitable variant of the model of the left atrium which can be adapted to the image to segment the left atrium. The adaptation process is typically based on continuous deformations of the model surface and thus no pulmonary veins can be added to or removed from the left atrium model.

The first model is simplified in the sense that it does not comprise the additional detail of the second model. Typically, the additional detail is a structural component of the model such as an additional tubular surface for segmenting a blood vessel connected to the object or additional vertices of the model mesh for modeling fine curvature variability of the model surface. Alternatively, the additional detail can be an additional term for describing interaction of the second model with the image or a new way of selecting image features for attracting the second model during adaptation to the image, determined based on the features extracted from the image by the analyzer 115.

After the selector 120 of the system 100 selects a second model, the second model is initialized by the initializer 125. Advantageously, the initialization may use information obtained from the adapted first model as well as information obtained from the features extracted from the image by the analyzer 115. The second adapter 130 is then arranged to adapt the initialized second model to the image.

Although the embodiments of the invention have been described with reference to the left atrium segmentation, a person skilled in the art will understand that the invention is useful for segmenting other objects as well, especially for segmenting objects existing in many anatomical or pathological variants with different dimensions and/or topology. Examples of such objects include, but are not limited to, coronary arteries and kidneys with their arterial feeding connections.

Those skilled in the art will further understand that other embodiments of the system 100 are also possible. It is possible, among other things, to redefine the units of the system and to redistribute their functions. For example, the same unit may be arranged to adapt first the first model and next the second model to the image. On the other hand, the analyzer 115 may be implemented by a number of coupled units, each performing an analysis task, e.g. region growing, connectivity check of the front of a grown region, etc. Although the described embodiments apply to medical images, other applications of the system, not related to medical applications, are also possible.

The units of the system 100 may be implemented using a processor. Normally, their functions are performed under the control of a software program product. During execution, the software program product is normally loaded into a memory, like a RAM, and executed from there. The program may be loaded from a background memory, such as a ROM, hard disk, or magnetic and/or optical storage, or may be loaded via a network like the Internet. Optionally, an application-specific integrated circuit may provide the described functionality.

Figure 4:
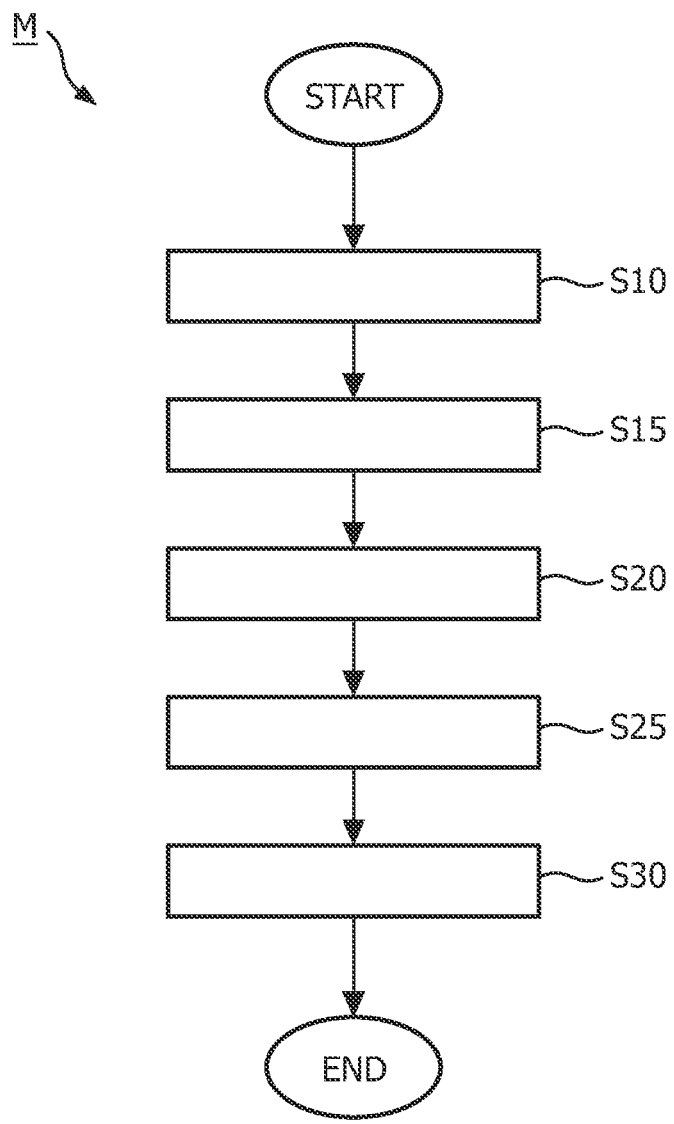
FIG. 4 shows a flowchart of exemplary implementations of the method.

An exemplary flowchart of the method M of segmenting an object in an image is schematically shown in FIG. 4. The method M begins with the step of adapting S10 a first model for segmenting the object to the image. After the first model is adapted to the image, the step of extracting S15 a feature from the image based on the adapted first model is performed. After extracting S15 the feature from the image, the step of selecting S20 a second model for segmenting the object based on the feature extracted from the image is performed, wherein the second model comprises additional detail of the object. After selecting S20 the second model, the method M continues by initializing S25 the second model based on the adapted first model and/or the feature extracted from the image. After initializing S25 the second model, the initialized second model is adapted to the image in the step of adapting S30 the second model to the image.

A person skilled in the art may change the order of some steps or perform some steps concurrently using threading models, multi-processor systems or multiple processes without departing from the concept as intended by the present invention. Optionally, two or more steps of the method M may be combined into one step. Optionally, a step of the method M may be split into a plurality of steps.

Figure 5:
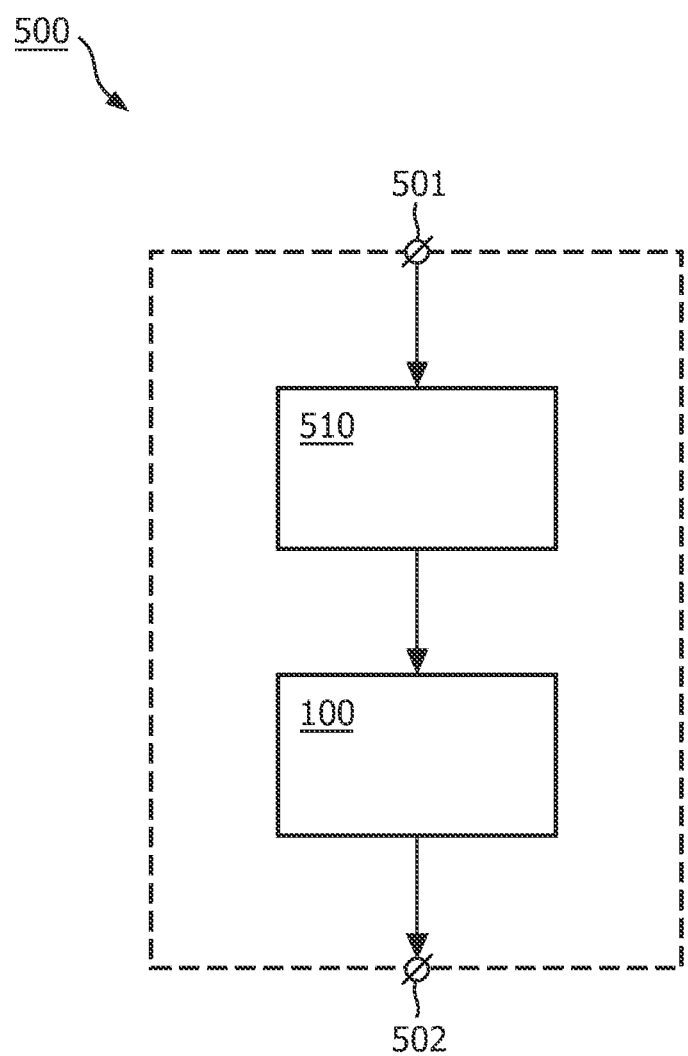
FIG. 5 schematically shows an exemplary embodiment of the image acquisition apparatus.

FIG. 5 schematically shows an exemplary embodiment of the image acquisition apparatus 500 employing the system 100 of the invention, said image acquisition apparatus 500 comprising an image acquisition unit 510 connected via an internal connection with the system 100, an input connector 501, and an output connector 502. This arrangement advantageously increases the capabilities of the image acquisition apparatus 500, providing said image acquisition apparatus 500 with advantageous capabilities of the system 100.

Figure 6:
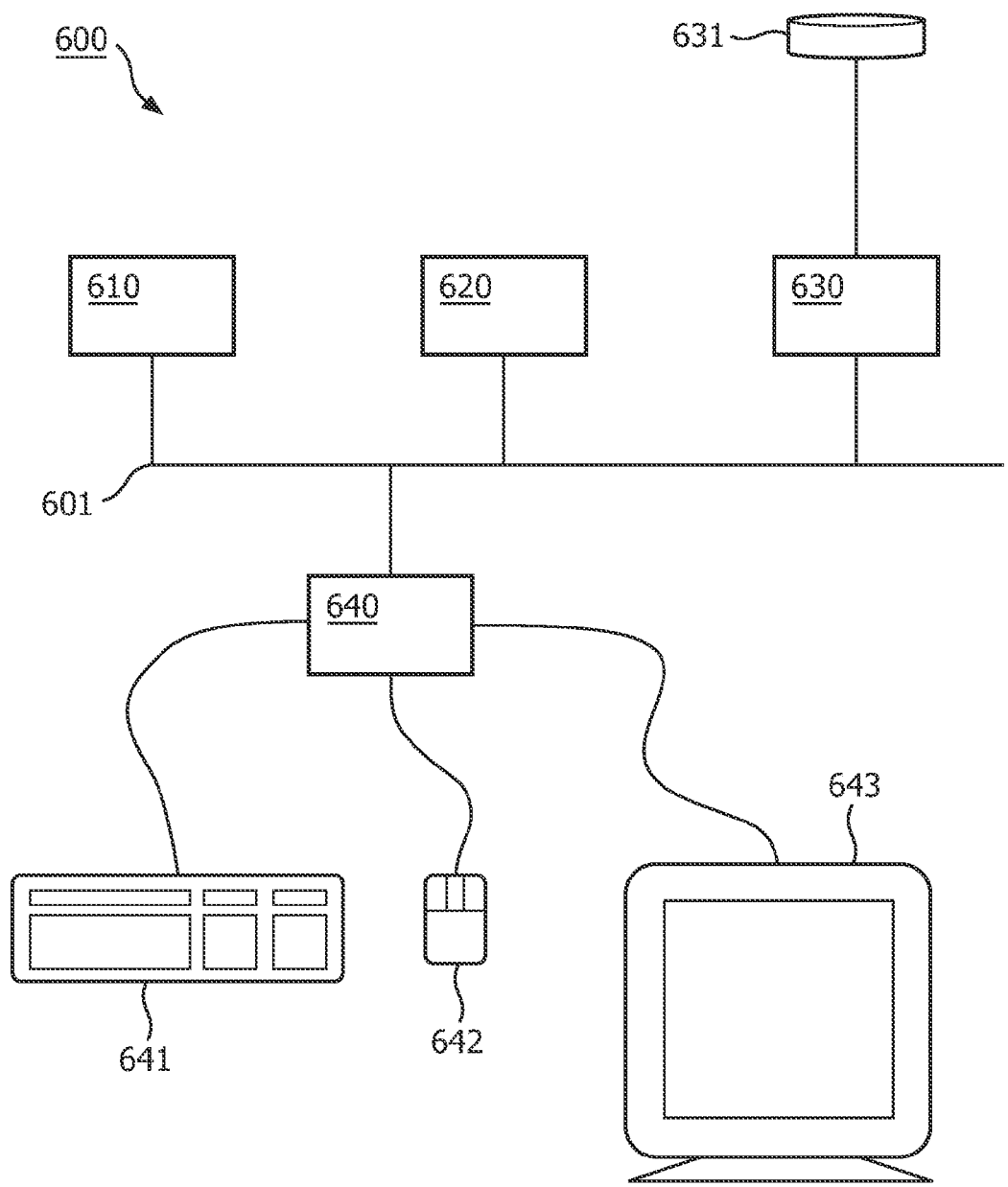
FIG. 6 schematically shows an exemplary embodiment of the workstation.

FIG. 6 schematically shows an exemplary embodiment of the workstation 600. The workstation comprises a system bus 601. A processor 610, a memory 620, a disk input/output (I/O) adapter 630, and a user interface (UI) 640 are operatively connected to the system bus 601. A disk storage device 631 is operatively coupled to the disk I/O adapter 630. A keyboard 641, a mouse 642, and a display 643 are operatively coupled to the UI 640. The system 100 of the invention, implemented as a computer program, is stored in the disk storage device 631. The workstation 600 is arranged to load the program and input data into memory 620 and execute the program on the processor 610. The user can input information to the workstation 600, using the keyboard 641 and/or the mouse 642. The workstation is arranged to output information to the display device 643 and/or to the disk 631. A person skilled in the art will understand that there are numerous other embodiments of the workstation 600 known in the art and that the present embodiment serves the purpose of illustrating the invention and must not be interpreted as limiting the invention to this particular embodiment.

It should be noted that the above-mentioned embodiments illustrate rather than limit the invention and that those skilled in the art will be able to design alternative embodiments without departing from the scope of the appended claims. In the claims, any reference signs placed between parentheses shall not be construed as limiting the claim. The word "comprising" does not exclude the presence of elements or steps not listed in a claim or in the description. The word "a" or "an" preceding an element does not exclude the presence of a plurality of such elements. The invention can be implemented by means of hardware comprising several distinct elements and by means of a programmed computer. In the system claims enumerating several units, several of these units can be embodied by one and the same record of hardware or software. The use of the words first, second, third, etc., does not indicate any ordering. These words are to be interpreted as names.

The invention claimed is:

1. A system for segmenting an object in a medical diagnostic image comprising;
   a processor programmed to;
      adapt is first deformable model for segmenting the object in the image;
      perform a steered region growing which is steered based on the adapted first deformable model;
      extract a feature from the image based on a result of the region growing;
      select a second deformable model for segmenting the object based on the feature extracted from the image wherein the second deformable model comprises additional detail of the object;
      initialize the second deformable model based on the adapted first deformable model and/or the feature extracted from the image; and
      adapt the initialized second deformable model to the image.

2. The system as claimed in claim 1, wherein the first deformable model includes a mesh and in the steered region growing growth space is limited based on the mesh and a landmark of the adapted first deformable model.

3. The system as claimed in claim 2, wherein the region growing detects blood vessels.

4. The system as claimed in claim 3, wherein the extracted feature is indicative of the detected blood vessels such that the second deformable model is selected based on the detected blood vessels.

5. The system as claimed in claim 4, wherein the first and second deformable models are left atrium models.

6. The system as claimed in claim 4, wherein the first and second deformable models are kidney models.

* * * * *